LaF. STEVENS.
ANIMAL-TRAP.
No. 191,260.  Patented May 29, 1877.
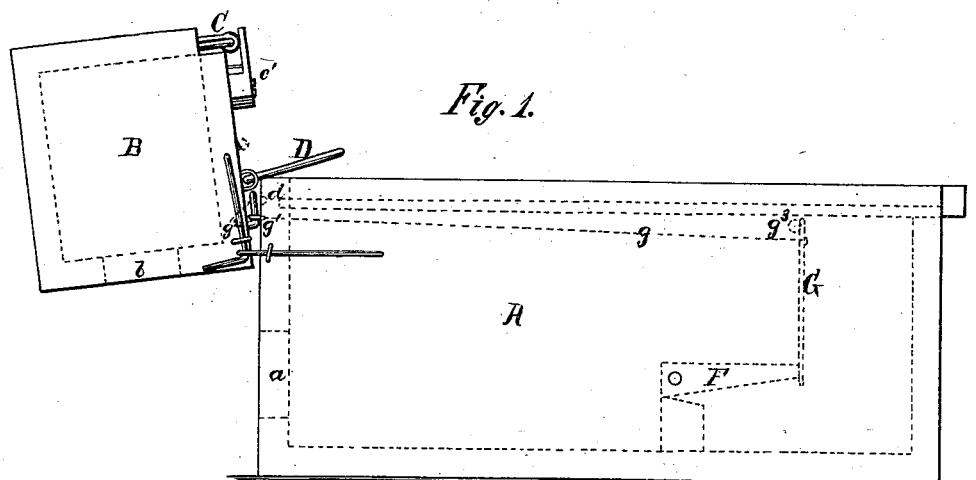
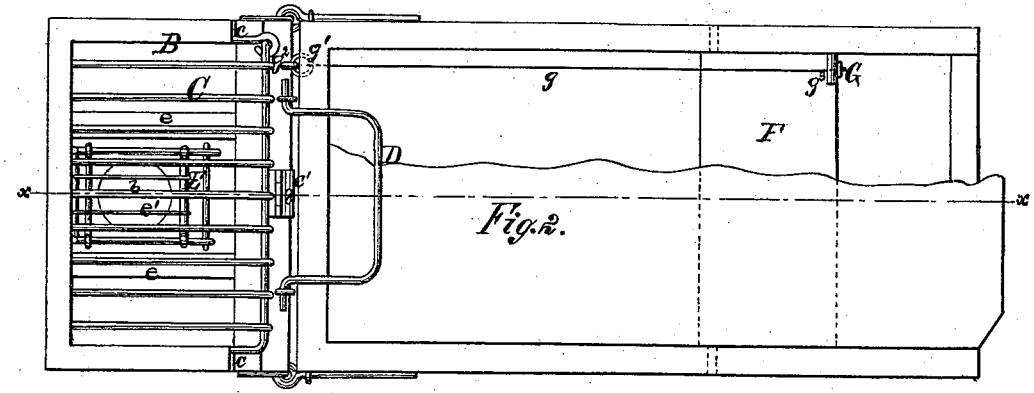
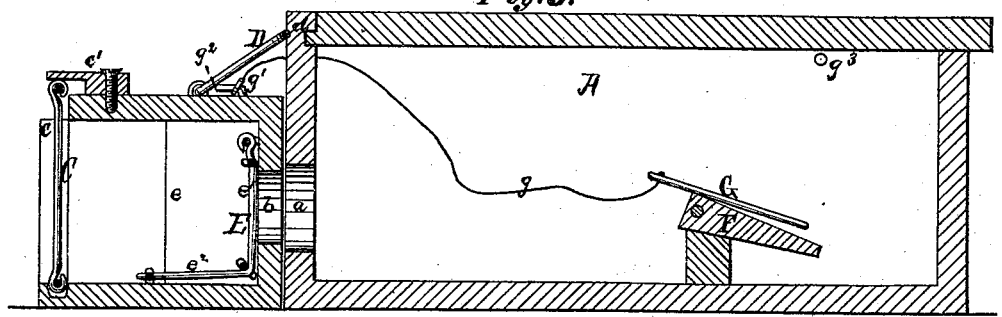
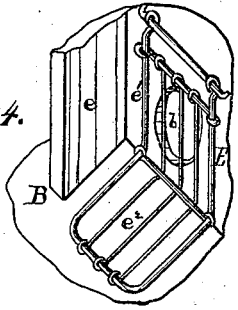
Witnesses:  Inventor
  La Fayette Stevens
  Per Fitch & Fitch
   Attys.

UNITED STATES PATENT OFFICE.

LA FAYETTE STEVENS, OF ELMIRA, NEW YORK.

IMPROVEMENT IN ANIMAL-TRAPS.

Specification forming part of Letters Patent No. 191,260, dated May 29, 1877; application filed December 20, 1876.

*To all whom it may concern:*

Be it known that I, LA FAYETTE STEVENS, of Elmira, Chemung county, in the State of New York, have invented an Improved Rat-Trap, of which the following is a full, clear, and exact description, reference being had to the accompanying drawings, forming part of this specification.

My invention relates to a trap for catching rats; and it consists in the parts and combination of parts hereinafter particularly shown and described, and recited in the claims.

Figure 1 is a side elevation of a trap embodying my invention. Fig. 2 is a plan of the same. Fig. 3 is a longitudinal central sectional view of the same on the line $x\,x$, Fig. 2; and Fig. 4 is a detailed view of the gate or door which closes the port of the trap-chamber.

The essential feature in the construction of my trap is, that I make the feed or bait box a distinct and separate chamber from the trap-chamber proper, preferably arranging the port of the feed-chamber, through which the vermin enter, so that when the trap is sprung the same port will lead into the trap-chamber through a port in the same, which falls opposite to the port of the said feed-chamber.

A is the feed or bait chamber. This may be made in the form of a box, closed by a lid, as shown, or may, in the case of a trap being employed in a feed or corn bin, be formed by partitioning off a corner of the said bin, and roofing the chamber thus formed. The bait-chamber has a port or opening, $a$, which communicates with the exterior of the box or bin, and which is the means of egress of the vermin into the bait-chamber. B is the trap-chamber. This chamber I hinge upon the bait-chamber, as shown, and, preferably, over the port $a$ of said chamber. The trap-chamber has a port, $b$, which, when the trap is sprung, comes opposite to the port $a$, and forms the means of egress for the vermin into the trap-chamber. The front wall of the trap-chamber is formed of a wire frame, C, which slides in grooves $c$ in the end pieces, and is secured by the button $c'$. When the vermin are caught in the trap-chamber this frame is withdrawn to dislodge the rats for killing. The hinges by which the chamber B is hung upon the chamber A are preferably detachable, as shown, so that the trap may be removed from the bait-chamber and carried to a place convenient for killing the rats. A bail, D, is hinged upon the top of the trap-chamber, and serves to carry the said trap conveniently, and also acts, in connection with a groove, $d$, in the face of the end wall of the bait-chamber, by resting therein when the trap is sprung, to hold the two chambers in the position shown in Fig. 3, and prevent the rats from lifting the trap B from the port $a$, and thus effecting an escape. The port $b$ is guarded by two side pieces or projections, $e$, as shown, and a gate, E, which is hinged over the port, and hangs across the same. The said gate is made of wire, and is in the form of two frames meeting each other at right angles, the frame $e^1$ extending across the port, and the frame $e^2$ resting upon the flooring of the trap between the studs $e$. By means of this gate, when the rats have entered the trap they are prevented from returning to the feed or bait chamber, as they will tread upon the frame $e^2$ in their endeavors to raise the gate E, while the said gate will offer no resistance to their entrance into the trap-chamber.

The operation of my trap is as follows: A hinged platform, F, is arranged horizontally and transversely in the bait-chamber, above the flooring thereof. This is connected with the trap-chamber to spring the same by means of rod or bar G, which has a cord or wire, $g$, attached to it near its upper end, the other end of said cord or wire having a loop or ring, $g^1$, which catches over a pin, $g^2$, fixed in the top of the trap-chamber. To set the trap the trap-chamber is swung upward, the cord or wire $g$ drawn taut, and the lower end of the bar G is rested against the platform F, which is brought to a horizontal position, while the upper end of said bar is caught against a pin, $g^3$, set in the wall of the bait-chamber, the cord passing under said pin to said bar G. The vermin enter the port $a$, and, feeding in the bait-chamber, run upon the platform F. Their weight disengages the same from the bar G, when the trap-chamber is released and falls upon the side of the bait-chamber, with the port $b$ connecting with the port $a$. It is well known that rats, upon being alarmed in any inclosure, will at once seek to escape by the same opening as that by which they entered. Hence, the vermin will rush into the trap-chamber B, and be confined therein. By this means the bait-chamber is always kept sweet and clean, as the vermin do not stink the feed or bait until alarmed, when their instant entrance into the chamber B prevents their wetting the chamber A. By this means the trap, when again set, will not operate to deter the entrance of the vermin into the bait-chamber, as is the case when the bait is placed in the same chamber as that in which the rats are confined after being caught.

What I claim as my invention, and desire to secure by Letters Patent, is—

1. In a device for catching rats, the combination, with the bait or feed chamber A, having the entrance-port $a$, of the trap-chamber B, having the port $b$, when the said chamber B is hinged upon the chamber A, over the port $a$, and is so arranged that, the trap being sprung, the chamber B will fall, and be securely held beside the chamber A, and the port $b$ will be coincident with the port $a$, as described, and for the purpose specified.

2. In a device for catching rats, the gate E, hung in the port $b$, and constructed with the frame $e^1$, covering the said port, and the frame $e^2$ at an angle thereto, and resting on the floor of the trap, together with the studs or side pieces $e$, as and for the purpose specified.

3. In a device for catching rats, the bait-chamber A, having port $a$, the hinged trap-chamber B, having port $b$, the gate E, the bail D, and its locking-groove $d$, the hinged platform F, the bar G, cord $g$, loop $g^1$, and pins $g^2$ and $g^3$, arranged to operate as and for the purpose specified.

LA FAYETTE STEVENS.

Witnesses:
JAMES N. WARD,
EDWARD C. VAN DUZEN.